(12) United States Patent
Kim

(10) Patent No.: US 10,589,721 B1
(45) Date of Patent: Mar. 17, 2020

(54) LOCKING SYSTEM FOR VEHICLES

(71) Applicant: Sung Bong Kim, Niles, IL (US)

(72) Inventor: Sung Bong Kim, Niles, IL (US)

( * ) Notice: Subject to any disclaimer, the term of this patent is extended or adjusted under 35 U.S.C. 154(b) by 0 days.

(21) Appl. No.: 16/236,582

(22) Filed: Dec. 30, 2018

Related U.S. Application Data

(60) Provisional application No. 62/612,572, filed on Dec. 31, 2017.

(51) Int. Cl.
| | |
|---|---|
| *B60R 25/24* | (2013.01) |
| *G07C 9/00* | (2020.01) |
| *B60R 25/10* | (2013.01) |
| *G08B 21/24* | (2006.01) |

(52) U.S. Cl.
CPC ............ *B60R 25/245* (2013.01); *B60R 25/10* (2013.01); *G07C 9/00309* (2013.01); *G08B 21/24* (2013.01); *B60R 2025/1013* (2013.01); *G07C 2009/00341* (2013.01); *G07C 2009/00515* (2013.01)

(58) Field of Classification Search
None
See application file for complete search history.

(56) References Cited

U.S. PATENT DOCUMENTS

| | | | | |
|---|---|---|---|---|
| 6,670,883 B1* | 12/2003 | Asakura | ................. | B60R 25/24 |
| | | | | 307/10.1 |
| 6,744,349 B1* | 6/2004 | Asakura | ................ | B60R 25/245 |
| | | | | 340/5.6 |
| 6,778,065 B1* | 8/2004 | Asakura | ................ | B60R 25/245 |
| | | | | 340/12.5 |
| 9,845,632 B2* | 12/2017 | Dezorzi | ................... | E05F 15/73 |
| 9,858,739 B1* | 1/2018 | Johnson | ................ | H04W 76/10 |
| 9,970,229 B1* | 5/2018 | Favila | .................... | E05F 15/70 |
| 2001/0054952 A1* | 12/2001 | Desai | ...................... | E05B 77/48 |
| | | | | 340/5.72 |
| 2008/0061930 A1* | 3/2008 | Narayanaswami | ..... | B60R 25/04 |
| | | | | 340/5.72 |
| 2014/0343755 A1* | 11/2014 | Rasal | .................. | B60R 25/2045 |
| | | | | 701/2 |
| 2016/0066254 A1* | 3/2016 | Colby | .................. | H04W 4/026 |
| | | | | 455/41.1 |
| 2016/0272152 A1* | 9/2016 | Iwata | ................. | G07C 9/00309 |
| 2018/0154867 A1* | 6/2018 | Golduber | ............... | G06Q 10/02 |
| 2018/0253959 A1* | 9/2018 | Andrade | ............... | B60N 2/002 |
| 2019/0176756 A1* | 6/2019 | Nicotra | .................. | G04C 21/04 |
| 2019/0210459 A1* | 7/2019 | Kojima | .................. | B60K 28/04 |
| 2019/0248327 A1* | 8/2019 | Huang | ................... | B60R 25/24 |

* cited by examiner

Primary Examiner — Carlos Garcia

(57) ABSTRACT

A locking system for vehicles is disclosed. After the engine is turned off, the vehicle in accordance with this invention checks whether it is in a garage with limited space. If it is, it leaves the doors unlocked. If it determines that it is not in a garage with limited space, it checks if the car key is inside the car after the driver exited the car. If it is, it sets off an alarm for the driver to retrieve the key. If the car key is not inside the car, it further checks if the key is in close proximity. When it no longer detects the key in its close proximity outside the car, it automatically locks the doors.

3 Claims, 2 Drawing Sheets

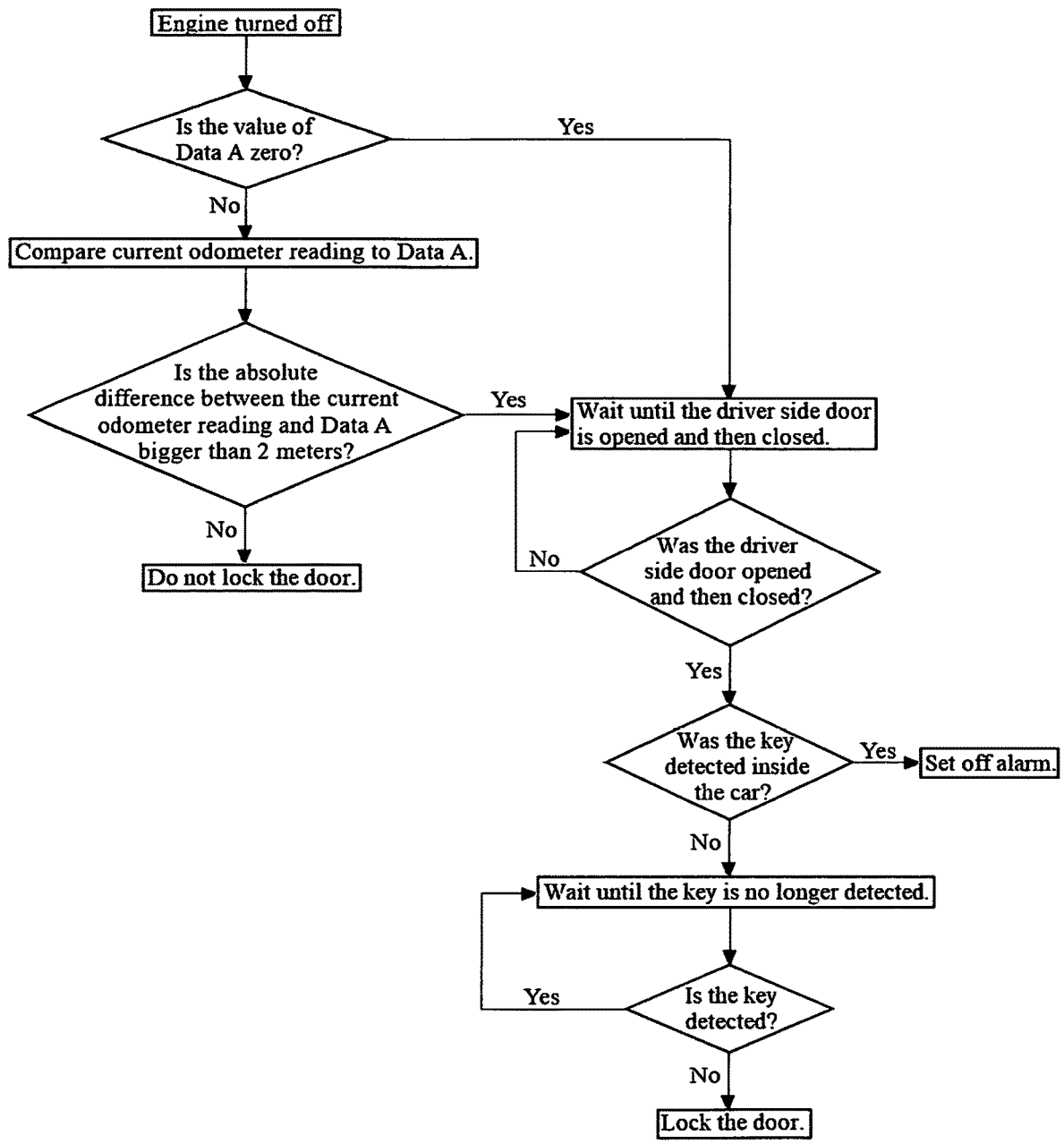

LOCKING SYSTEM FOR VEHICLES

CROSS-REFERENCES

This application claims the benefit of U.S. Provisional Patent Application No. 62/612,572 filed on Dec. 31, 2017, which is hereby incorporated by reference in its entirety.

BACKGROUND OF THE INVENTION

Field of the Invention

The present invention relates to the locking system for vehicles.

Background

When people park their cars and leave them unattended, the doors need to be locked. While it is more desirable to have the car doors locked automatically after they are left unattended, attempts to automatically lock the car doors have been generally unsuccessful for a number of reasons, and people have been locking the car doors manually when they leave their vehicles unattended. When the car doors are to be locked manually, people often forget to lock the vehicles leaving them unlocked. Or, sometimes, people get uneasy that they might have forgotten to lock their car doors and go back to the vehicle to make sure that the doors are locked.

Lately, a new wireless smart key technology was introduced that allows the vehicle to detect the presence of the key. With additional sensors in the vehicle, it can even tell whether the key is inside the vehicle or it is not. With this new smart key technology, it became possible and practical to have the car doors locked automatically whenever they are to be left unattended without any drawbacks. The only exception that the car should not be locked automatically would be when the vehicle is in the owner's closed garage or when the driver is still in its close proximity.

SUMMARY OF THE INVENTION

The present invention relates to the locking system for vehicles. A sensor is provided in the vehicle in accordance with this invention to detect whether the garage door has been actuated. Each time the garage door is actuated, the on-board computer records the odometer reading of the vehicle at that moment as Data A in its memory. Every time the engine is turned off, the on-board computer computes the value difference between this Data A and the odometer reading of the vehicle at the time the engine is turned off. If the value difference is very small, it means the car is parked in a garage with limited space such as private garage, and the on-board computer decides to leave the doors unlocked even if the driver walks away with the key.

If the value difference is a substantial number such as greater than a few meters or the value of Data A is zero, it means that it is not in a garage with limited space and it is to be left unattended in an open area or on the street. In this case, the on-board computer further checks with the help of multiple key sensors if the car key is inside the car after another sensor detects that the driver exited the car. If it is, it sets off an alarm for the driver to retrieve the key. If the car key is not inside the car after the driver exited the vehicle and the on-board computer no longer detects the key in its close proximity outside the car, it automatically locks the doors.

BRIEF DESCRIPTION OF THE DRAWINGS

FIG. 3 is a flow diagram that shows what happens after the engine is turned off.

DETAILED DESCRIPTION OF THE PREFERRED EMBODIMENT

Figure 1:
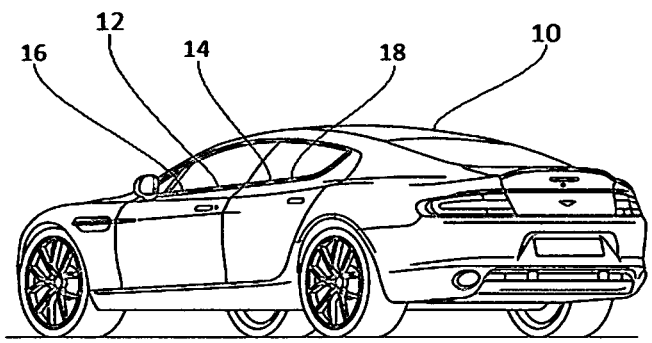
FIG. 1 is a perspective view of a vehicle in accordance with the present invention.

A vehicle in accordance with the present invention is shown in FIG. 1 with a general reference number 10. A sensor 12 is installed anywhere in the vehicle to detect the signal from a garage door opener (not shown) being actuated.

Figure 2:
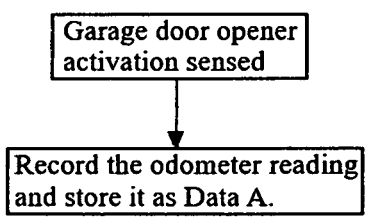
FIG. 2 is a flow diagram that shows what happens when a garage door opener has been actuated.

When the garage door opener is actuated, the sensor 12 detects its radio signal and prompts, as FIG. 2 shows, the on-board computer 16 (not shown) to record the vehicle's odometer reading at that moment in its memory as Data A. Each time a garage door opener is actuated regardless whether the vehicle is entering or exiting the garage, the new odometer reading will replace the value of the preceding Data A.

As FIG. 3 shows, when the driver turns off the engine, the on-board computer 16 checks if the value of Data A is zero. If it is, that means the owner does not have a garage and the vehicle will be left unattended where it is accessible to general public.

If the value of Data A is greater than zero, it means that the driver uses a garage. Then the on-board computer 16 further computes the value difference between Data A and the odometer reading at the moment the engine was turned off. The value of this difference is the distance the vehicle has traveled between the time when the engine was turned off and the time the garage door was closed. If the difference is zero, or a very small number such as less than 2 meters, it means the engine was turned off in a private garage with limited space. In this case, the on-board computer 16 decides to leave the car doors unlocked so that the driver or the driver's family member can easily get access to the inside of the vehicle without the key. Since the driver may turn off the engine before or after the driver closes the garage door, only the absolute value of the difference has meaning.

If the difference is quite a large number, that means the vehicle has been driven inside a large gated garage such as in a condominium building, or it has been driven outside of any garage and to be left unattended on the street. In this case, the on-board computer 16, as shown in FIG. 3, checks if the driver side car door has been opened and closed using the conventional door sensor 14 (not shown), to decide if the driver exited the vehicle. When the on-board computer 16 detects that the driver side door has been opened and subsequently closed, it further checks if it detects the car key inside the vehicle using the signals from multiple key sensors 18 (not shown). If it does, it sets off an alarm so that the driver can retrieve the key.

When both the driver and the key are outside the vehicle and the driver walks away from the vehicle with the key, the on-board computer 16 soon will lose the signal from the car key and the on-board computer 16 is prompted to lock the vehicle automatically.

If the value of Data A is zero, it means the driver does not use garage and the vehicle will be left unattended in an open area or street. In this case, the on-board computer 16 directs the doors to be locked automatically following the same procedure as if the value difference between Data A and the odometer reading at the moment the engine was turned off is a substantial number such as greater than 2 meters.

Waiting until the on-board computer 16 can no longer detect the car key before it locks the doors allows the driver to get out of the vehicle while the doors are still unlocked. It also allows the driver to open the doors freely to load or unload the vehicle after the driver got out of the car.

What is claimed is:

1. A vehicle comprising:
   a plurality of first sensors to detect a presence of a car key in close proximity;
   a second sensor to detect if the a driver side door has been opened and subsequently closed;
   an on-board computer to lock the vehicle automatically when the engine is turned off and said first sensors no longer detect the presence of the car key inside or outside the vehicle after said second sensor indicates that a driver has exited the vehicle.

2. The vehicle of claim 1 further comprising:
   a third sensor to detect an actuation signal from a garage door;
   said on-board computer to record the odometer reading of the vehicle as Data A in its memory when said third sensor detects that the garage door has been actuated;
   said on-board computer to compute the value difference between said Data A and the odometer reading of the vehicle at the moment the engine is turned off;
   said on-board computer to decide to leave the doors unlocked after the engine is turned off if the value of said Data A is not zero and said value difference is very small number such as less than two meters, or to automatically lock the doors of the vehicle after it is determined by said first and second sensors that the key and the driver are no longer inside the vehicle and the value of said Data A is zero, or said value difference is greater than the distance the vehicle would have traveled in a garage with limited space.

3. The vehicle of claim 2 further comprising:
   said on-board computer to set off an alarm when said first sensors indicates that the key is inside the vehicle after the engine is turned off, and said second sensor indicates that the driver exited the vehicle.

\* \* \* \* \*